Feb. 18, 1958
W. HOFFMANN
2,823,853
CENTRIFUGAL SEPARATOR FOR PURIFYING
LIQUIDS WHICH EMIT HARMFUL VAPORS
Filed Feb. 1, 1955
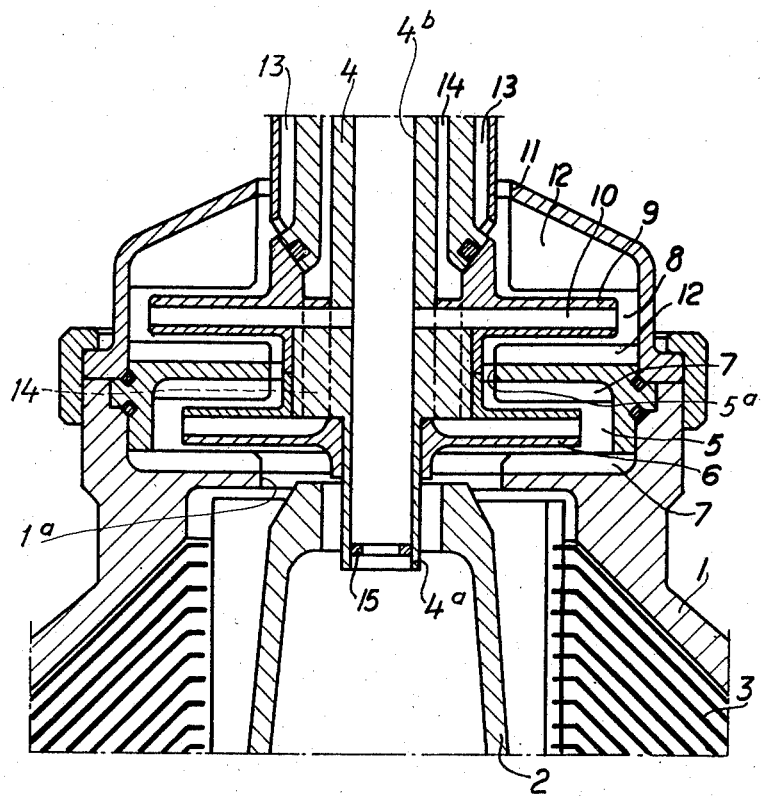
INVENTOR
Walter Hoffmann
BY
Davis, Hoxie & Faithfull
ATTORNEYS

United States Patent Office 2,823,853
Patented Feb. 18, 1958

2,823,853

CENTRIFUGAL SEPARATOR FOR PURIFYING LIQUIDS WHICH EMIT HARMFUL VAPORS

Walter Hoffmann, Lidingo, Sweden, assignor to Aktiebolaget Separator, Stockholm, Sweden, a corporation of Sweden Application February 1, 1955, Serial No. 485,487

Claims priority, application Sweden February 15, 1954

5 Claims. (Cl. 233—21)

This invention relates to the centrifugal separators of liquids which emit harmful vapors, and has particular reference to an improved centrifugal separator for this purpose which is sealed against escape of the harmful vapors.

Purification by centrifuging of such liquids as emit explosive, poisonous or otherwise harmful gases must be carried out in centrifuges of a special design. It has been proposed to use so-called paring disc centrifuges having one or more sealing chambers arranged outside the paring disc or discs, these chambers being provided with sealing discs and, during the separation, containing sealing liquid. In order to maintain the liquid level in these sealing chambers during the separation, sealing liquid must be supplied through an inlet. The sealing liquid is heated by the friction during the separation and therefore should be as cold as possible when it is fed into the sealing chamber and should circulate through this chamber. For this purpose, the sealing chamber must also be provided with an outlet and is preferably inserted in a circulation circuit in which a cooler is included, unless there is cold water or other cooling medium available in a sufficient amount and this liquid can be used as sealing liquid without impairing the separation material.

The problem of sealing such centrifuges is met in a very simple manner by the present invention, according to which the feed material to be separated is used as the sealing liquid by branching off a part of this material, before any heating thereof, and leading this part through the sealing chamber and then returning it to the feed material prior to centrifugal separation thereof.

A centrifugal separator made according to the present invention comprises a paring device, which may be arranged in a paring chamber, and a sealing chamber arranged outside this paring device and containing a sealing disc, the sealing chamber being supplied with sealing liquid from outside the sealing chamber. The centrifugal separator is characterized by the fact that the sealing chamber is provided with an outlet for the sealing liquid, and this outlet is connected with the inlet for the separation material fed to the separator. The outlet from the sealing chamber may comprise, for example, an overflow outlet through which the sealing liquid is discharged to a pump, or the like, which delivers the sealing liquid into the separator inlet for the material to be separated; or the outlet from the sealing chamber may comprise a paring device which is arranged in the sealing chamber and is connected with this inlet for the separation material. In the latter case, the sealing disc proper is advantageously designed as a paring device, the liquid channels of which are directly connected with an inlet channel for the separation material extending centrally through the sealing disc.

For a better understanding of the invention, reference may be had to the accompanying drawing, in which the single illustration is a vertical sectional view of the upper portion of a centrifugal separator embodying the invention.

Referring to the drawing, the upper part or hood of the centrifugal bowl is shown at 1. Within the rotary bowl is the usual distributor 2 for the feed material to be separated, and a stack of conical discs 3 forming separating spaces. The separation material is fed into the distributor 2 from a feed pipe 4a formed by a stationary head 4, and from the distributor it flows in the usual manner into the separating chamber of the bowl where a separating action takes place between the discs 3. The illustrated embodiment of the invention is assumed to be designed for discharge of only one liquid component, the impurities separated from this component being accumulated as a heavier component in the separating chamber at its peripheral part (not shown) surrounding the discs 3.

In the upper part 1 of the centrifugal bowl is a paring chamber 5 containing a paring-out device 6 which may be a paring disc of conventional form. The paring chamber 5 may be provided with the usual conveyor vanes 7; and above this chamber (or outside it as reckoned in the axial direction of the bowl) is a sealing chamber 8 which communicates with the paring chamber 5 by way of an overflow outlet 5a. The sealing chamber 8 contains a sealing disc 9 which is provided with channels 10 and thus serves as a paring disc at the same time. At its outer portion (again reckoned axially of the bowl), the sealing chamber 8 has an overflow outlet 11 and preferably contains conveyor vanes 12. Sealing liquid is fed to the sealing chamber 8 through one or more channels 13 in the stationary head 4 which supports the paring discs 6 and 9. The outlet from the paring-out device 6 is formed by one or more channels 14 also located in the stationary head 4.

In the use of the centrifuge, the separation material is supplied through the central channel 4b which terminates in the feed pipe 4a of the head 4. The purified liquid flows upward over level outlet 1a into chamber 5, from which it is disccharged by means of paring-out device 6 and leaves through the channels 14. A quantity of feed liquid is diverted from the separation material passing to the feed channel 4b and is fed into the sealing chamber 8 by way of channels 13 during the separation. Thus, in the sealing chamber 8 a liquid level is formed, the position of which is determined by the counter-pressure in the channels 10 of the sealing disc 9, through which channels the sealing liquid from the sealing chamber 8 is pared out and led directly into the central inlet 4b for the separation material passing into the centrifugal bowl. It will be apparent that the stationary head 4 in conjunction with the sealing disc 9 constitutes a means for forming a sealing liquid outlet 10 leading from the sealing chamber 8 to the inlet 4b for the material to be separated.

By means of the centrifugal separator of the present invention, it is possible to carry out the purification of separation material at high temperature. In the purifying of boiler fuel oils, for example, the centrifuging can be effected at 150° C. Before it is fed into the centrifuge, the separation material is heated to the centrifuging temperature. However, a portion of the separation material, usually a relatively small portion of it, is diverted from the main portion and is fed, non-heated or heated to a considerably lower temperature, through the channels 13 to the sealing chamber 8 and is then rejoined with the main portion of the separation material after passing through the channels 10 of the sealing disc 9. Thus, the sealing liquid, after having passed through the sealing chamber 8, is heated to the separation temperature.

The inlet 4b of the centrifuge may be directly connected through a closed line with the pump (not shown) which feeds the separation material from a container or the like, to the centrifuge. In this case, the pump should be provided in the usual manner with an overflow valve. This overflow valve can be used so that overflowing in the centrifuge is avoided if it would happen that the outlet channels 14 from the paring-out device 6 are closed without the inlet from the pump being closed beforehand. If, under these conditions, the outlet channels 14 from the paring-out device 6 are shut off, separated liquid is led from the paring chamber 5 via the overflow outlet 5a into the sealing chamber 8 and is returned from the latter through the channels 10 to the inlet 4b. This causes an increase in pressure in the inlet. By dimensioning the channels and the pump overflow valve (not shown) in a suitable manner, this increase in pressure can be made to react upon the overflow valve so that it is opened, whereby the supply of feed or separation material to the separator is cut off. This insures that the separator will not flow over in case the outlet channels 14 from the paring-out device 6 are shut off, through an oversight or the like, without the inlet to the separator having first been shut off. To obtain this effect it may be necessary, under certain circumstances, to insert a throttle 15 in the inlet to the separator.

The outlet connecting the sealing chamber 8 with the inlet 4b may be formed by means other than the channels 10. For example, it may comprise the overflow outlet 11 from which the sealing liquid is collected in a suitable device (not shown) and pumped into the inlet 4b.

I claim:

1. A centrifugal separator for purifying liquids which emit harmful vapors at the separating temperature, which comprises a centrifugal bowl having a paring chamber for receiving purified liquid from the interior of the bowl, the bowl also having a sealing chamber outside the paring chamber, a paring device in said paring chamber for discharging purified liquid therefrom, and a sealing disc in the sealing chamber, the separator having an inlet for the material to be separated and also having a channel for feeding a sealing liquid into the sealing chamber, whereby the sealing liquid coacts with said disc to seal the paring chamber, the separator also having a sealing liquid outlet leading from the sealing chamber to said inlet for the material to be separated.

2. A centrifugal separator according to claim 1, in which the sealing chamber has an overflow outlet.

3. A centrifugal separator according to claim 1, in which said sealing liquid outlet is located in the sealing disc.

4. A centrifugal separator according to claim 1, in which said sealing disc is a paring device having a liquid channel forming said sealing liquid outlet, said inlet extending centrally through the sealing disc and being connected to said last channel.

5. A centrifugal separator according to claim 1, comprising also a stationary head in which said inlet is centrally located, the head supporting said paring device and sealing disc, the head having a channel leading from said paring device for passage of purified liquid, the sealing liquid outlet being a channel formed in said sealing disc and head and leading inward from the sealing chamber to said inlet.

References Cited in the file of this patent

UNITED STATES PATENTS

| | | |
|---|---|---|
| 2,344,888 | Lindgren | Mar. 21, 1944 |

FOREIGN PATENTS

| | | |
|---|---|---|
| 479,007 | Great Britain | Jan. 28, 1938 |
| 616,405 | Great Britain | Jan. 20, 1949 |